United States Patent
Nakada

(10) Patent No.: US 9,574,505 B2
(45) Date of Patent: Feb. 21, 2017

(54) PLANT CONTROL DEVICE

(75) Inventor: Hayato Nakada, Minamitsuru-gun (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 43 days.

(21) Appl. No.: 14/423,859

(22) PCT Filed: Aug. 29, 2012

(86) PCT No.: PCT/JP2012/071863
§ 371 (c)(1),
(2), (4) Date: Feb. 25, 2015

(87) PCT Pub. No.: WO2014/033858
PCT Pub. Date: Mar. 6, 2014

(65) Prior Publication Data
US 2015/0322871 A1    Nov. 12, 2015

(51) Int. Cl.
*F02D 29/02*    (2006.01)
*G05B 13/04*    (2006.01)

(52) U.S. Cl.
CPC .............. *F02D 29/02* (2013.01); *G05B 13/048* (2013.01)

(58) Field of Classification Search
CPC .. F02D 29/02; F02D 41/1409; F02D 41/1415; F02D 41/1423; G05B 13/02; G05B 13/04; G05B 13/048; Y02T 10/20; Y02T 10/26
USPC ............ 701/99–105, 107, 109, 114; 123/674
See application file for complete search history.

(56) References Cited

U.S. PATENT DOCUMENTS 6,009,371 A * 12/1999 Kobayashi ............ B60K 6/445
                                                    123/339.19
6,826,521 B1    11/2004 Hess et al.
7,155,334 B1 * 12/2006 Stewart ................. F02D 35/023
                                                    123/434

(Continued)

FOREIGN PATENT DOCUMENTS

JP    2004-270657 A    9/2004
JP    2010-084523 A    4/2010
JP    2010-253501 A    11/2010

OTHER PUBLICATIONS

H. Nakada, et al., "Application of Reference Governor Using Soft Constraints and Steepest Descent Method to Diesel Engine Aftertreatment Temperature Control," Institute of Systems, Control and Information Engineers (2012), 4 pages, (English abstract provided).

(Continued)

*Primary Examiner* — John Kwon
*Assistant Examiner* — Johnny H Hoang
(74) *Attorney, Agent, or Firm* — Andrews Kurth Kenyon LLP

(57) ABSTRACT

A plant control device according to the present invention includes a feedback controller and a reference governor. The feedback controller is configured to determine a control input of a plant by feedback control so as to bring an output value of a control amount of the plant close to a target value. The reference governor is configured to calculate a future predicted value of a specific state quantity of the plant by using a model of a closed loop system including the plant and the feedback controller, and correct the target value that is given to the feedback controller based on the predicted value of the specific state quantity and a constraint that is imposed on the specific state quantity.

4 Claims, 5 Drawing Sheets

(56) References Cited

U.S. PATENT DOCUMENTS

| | | | |
|---|---|---|---|
| 7,853,338 B1* | 12/2010 | Hovakimyan | G05B 13/027 700/31 |
| 2003/0101975 A1* | 6/2003 | Yoshizawa | F02D 41/1403 123/674 |
| 2003/0114979 A1* | 6/2003 | Yoshizawa | F02D 41/1402 701/109 |
| 2004/0030485 A1* | 2/2004 | Yasui | F02D 41/1494 701/109 |
| 2010/0024787 A1* | 2/2010 | Chi | F02D 41/0072 123/568.11 |
| 2011/0004390 A1 | 1/2011 | Nomura et al. | |
| 2011/0166767 A1* | 7/2011 | Kurtz | F01N 9/002 701/103 |
| 2013/0289857 A1* | 10/2013 | Schmitt | F01N 11/005 701/113 |

OTHER PUBLICATIONS

"Application of Reference Governor Using Soft Constraint and Steepest Descent Method to Automotive Diesel Engine Aftertreatment Temperature Control" SAE International (2013), 15 pages.

A. Bemporad, "Reference Governor for Constrained Nonlinear Systems," IEEE Transactions on Automatic Control, vol. 43, No. 3 (1998), pp. 415-419.

E. Gilbert, et al., "Nonlinear tracking control in the presence of state and control constraints: a generalized reference governor," Automatica, vol. 38 (2002), pp. 2063-2073.

\* cited by examiner

FIG. 4

```
0   Given ψ₀, Δ_ref, i_max
1   i:=0, w_cand:=r, ψ:=ψ₀, ∇_prev:=0
2   while i ≤ i_max
3       % Evaluate the gradient of objective function
            ∇:=[J(w_cand+Δ_ref)−J(w_cand−Δ_ref)]/2Δ_ref
4       % Compute next candidate of modified reference
            w_cand:=w_cand−ψ∇
5       if i ≥ 1 and sgn(∇) ≠ sgn(∇_prev)
6           ψ:=ψ/2
7       end
8       if i=i_max
9           w=w_max and break
10      else
11          i:=i+1, ∇_prev:=∇
12      end
```

PLANT CONTROL DEVICE

CROSS-REFERENCE TO RELATED APPLICATION

This is a national phase application based on the PCT International Patent Application No. PCT/JP2012/071863 filed Aug. 29, 2012, the entire contents of which are incorporated herein by reference.

TECHNICAL FIELD

The present invention relates to a control device for a plant, and more particularly relates to a control device that corrects a target value of a control amount of a plant by using a reference governor so that a constraint that is imposed on a state quantity of the plant is satisfied.

BACKGROUND ART

An ordinary plant control device is configured to determine the control input of the plant by feedback control so as to cause the output value of a control amount to follow a target value when the target value is given in regard to the control amount of the plant. However, in actual control of the plant, various constraints are often present in hardware or control in regard to the state quantity of the plant. If these constraints are not satisfied, there is a concern of occurrence of breakage of the hardware and reduction in the control performance. Satisfiability of constraints is one of important performances which are requested in control of the plant, as well as followability of the output value to the target value.

A reference governor is effective means for satisfying the above described request. A reference governor includes a prediction model which is obtained by modeling a closed loop system (a feedback control system) including a plant which is a control target and a feedback controller, and predicts a future value of the state quantity on which a constraint is imposed according to the prediction model. Subsequently, the reference governor corrects the target value of the control amount of the plant based on the predicted value of the state quantity and the constraint imposed on the state quantity.

What is considered as important in design of the reference governor is the content of the evaluation function for use in calculation of a corrected target value. If consideration is given to only satisfiability of the constraint, various evaluation functions can be adopted. However, depending on what evaluation function is used to determine the corrected target value, the following characteristic of the output value to the target value of the control amount significantly changes, and the transient response characteristics of the output value to the change of the target value of the control amount also significantly changes. Especially in the case of the plant in which the response characteristics vary in response to the operation conditions as in the internal combustion engine for an automobile, the transient response characteristics of the output value to the change of the target value of the control amount significantly vary depending on the operation conditions. To enable favorable transient response characteristics to be achieved while satisfying a constraint is an important problem for a plant control device, in particular, a plant control device the control target of which is a plant in which the response characteristics change in response to the operation conditions.

As an example of the prior art which applies a reference governor to the control of a plant, the prior art disclosed in Patent Literature 1 as follows can be cited. The prior art relates to tension control of the rolled steel material in a multistage rolling mill. In the prior art disclosed in Patent Literature 1, the target orbit data specifying the temporal change of the tension of the rolled steel material is calculated in advance by the reference governor, and the tension of the rolled steel material is controlled based on the deviation between the actual tension value of the rolled steel material and the target orbit data. However, in this prior art, the control target is not a plant in which the response characteristics change in response to the operation conditions, and calculation of the target orbit data by the reference governor is performed offline. Therefore, even if the prior art is applied to the plant in which the response characteristics change in response to the operation conditions, the prior art cannot solve the problem of achieving favorable transient response characteristics while satisfying a constraint.

CITATION LIST

Patent Literature

Patent Literature 1: Japanese Patent Laid-Open No. 2010-253501
Patent Literature 2: Japanese Patent Laid-Open No. 2010-084523
Patent Literature 3: Japanese Patent Laid-Open No. 2004-270657

SUMMARY OF INVENTION

The inventor of the present application performed earnest study on what evaluation function could solve the above described problem. Then, as a result of comparing and examining various evaluation functions, the inventor of the present application has found out that the evaluation function which will be described next is the optimal evaluation function to the reference governor of the plant control device. The evaluation function is the evaluation function which is expressed by an objective function with a corrected target value candidate as a variable, and a penalty function. The penalty function is configured to add penalty to the objective function when a predicted value of the state quantity on which a constraint is imposed conflicts with the constraint. The objective function is configured so that the smaller the distance between the original target value and the corrected target value candidate is the smaller value the objective function takes. It has been confirmed that according to the evaluation function, favorable transient response characteristics can be achieved while the constraint which is imposed on the state quantity of the plant is satisfied. Further, the evaluation function can be solved as an optimization problem without a constraint, and therefore, a calculation load on the plant control device also can be reduced by reducing the calculation amount which is applied to online calculation of the reference governor.

Hereinafter, an outline of a plant control device according to the present invention to which the above described evaluation device is applied will be described.

A plant control device according to the present invention includes a feedback controller and a reference governor. The feedback controller is configured to determine a control input of a plant by feedback control so as to bring an output value of a control amount of the plant close to a target value. The kind and the configuration of the plant which is a control target are not limited. However, the plant control device according to the present invention can be especially preferably applied to the plant in which the response characteristics change in response to the operation conditions as in the internal combustion engine for an automobile. The reference governor is configured to calculate a future predicted value of a specific state quantity of the plant by using a model of a closed loop system including the plant and the feedback controller, and correct the target value that is given to the feedback controller based on the predicted value of the specific state quantity and a constraint that is imposed on the specific state quantity. In the calculation of the corrected target value, the reference governor uses the above described evaluation function. In more detail, the reference governor is configured to search for an optimal value of the above described evaluation function while changing the corrected target value candidate, and determine the corrected target value candidate which optimizes the evaluation function as the corrected target value.

As the method for searching for the optimal value of the evaluation function by the reference governor, repeated calculation using a steepest descent method is preferable. It is more preferable that in the repeated calculation using the steepest descent method, the corrected target value candidate is updated with the update amount proportional to the gradient of the evaluation function, and the proportional coefficient which is multiplied by the gradient is decreased each time a sign of the gradient is inverted.

In a preferable mode of the plant control device according to the present invention, the plant control device further includes an observer. The observer is configured to estimate a state of the closed loop system by using the model of the closed loop system. In this mode, the reference governor is configured to calculate an error between the estimated value of the specific state quantity estimated by the observer and an actual value of the specific state quantity obtained from the plant, and correct a value of a constraint that is defined by the penalty function in accordance with the error.

BRIEF DESCRIPTION OF DRAWINGS

FIG. 4 is a diagram showing a program description of an optimization algorithm of an evaluation function of the plant control device according to embodiment 1 of the present invention.

DESCRIPTION OF EMBODIMENTS

Embodiment 1

Hereinafter, embodiment 1 of the present invention will be described with reference to the drawings.

Figure 1:
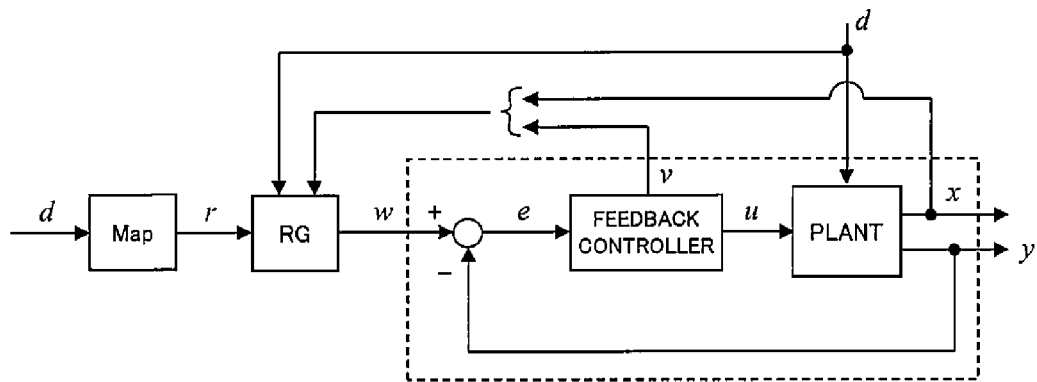
FIG. 1 is a diagram showing a target value following control structure of a plant control device according to embodiment 1 of the present invention.

FIG. 1 shows a target value following control structure of a plant control device according to the present embodiment. The present plant control device includes a target value map (MAP), a reference governor (RG) and a feedback controller. To a plant that is a control target of the present plant control device, a control input u and an exogenous input d from the feedback controller are inputted. By these inputs, a state quantity x and a control output (an output value of a control amount) y of the plant are determined. In more detail, the state quantity x and the control output y of the plant can be expressed by expression (1) as follows. Expression (1) is a model expression which models the plant. In the model expression, f and g represent functions of the model expression. A subscript k of each symbol represents a discrete time step.

[Mathematical expression 1]

$$x_{k+1}=(x_k,u_k,d_k)$$

$$y_k=g(x_k,u_k,d_k)$$

$$x_k \in R^n, u_k \in R, d_k \in R^1, y_k \in R \quad (1)$$

The feedback controller determines the control input u of the plant by feedback control so as to bring the control output y of the plant close to a corrected target value w that is given by the reference governor. The feedback controller is a proportional integral feedback controller expressed by expression (2) as follows. In expression (2), $K_p$ represents a proportional gain, and e represents an error. Further, $K_i$ represents an integral gain, and v represents an error integration value. Note that the proportional integral feedback controller which is introduced here is only one example of the feedback controller which can be used in the present invention. Depending on the response characteristics of the system desired, a proportional integral and differential controller also can be used.

[Mathematical expression 2]

$$u_k = K_p e_k + K_i v_k \quad (2)$$

$$v_k = v_{k-1} + e_k$$

$$e_k = w_k - y_k$$

$$v_k \in R, e_k \in R, K_p, K_i \in R, w_k \in R \quad (2)$$

The feedback controller and the plant configure a closed loop system as shown by a broken line frame in FIG. 1. The reference governor includes a prediction model which is obtained by modeling the closed loop system. The prediction model is the model in which the plant model shown by expression (1) and the feedback controller shown by expression (2) are joined to each other. To the reference governor, a target value r of the control amount which is determined based on the exogenous input d in the target value map is inputted. Further, to the reference governor, the state quantity x of the plant, the error integration value v which is the state quantity of the feedback controller and the exogenous input d are inputted.

The reference governor calculates a prediction value y^ of the control output y of the plant by using the prediction model. In the present embodiment, the control output y is one of the state quantities of the plant, and a constraint is imposed on the control output y. It is the constraint imposed on the control output y that the control output y is equal to or smaller than an upper limit value y⁻. In calculation of the control output prediction value y^, the corrected target value w is used in addition to the plant state quantity x, the error integration value v and the exogenous input d. The reference governor calculates the corrected target value w by using an evaluation function which will be described as follows, based on the control output prediction value y^ and the control output upper limit value y⁻.

First, a comparative example of the evaluation function will be described, prior to explanation of the evaluation function which is adopted in the plant control device according to the present embodiment. The evaluation function as a comparative example is expressed as an optimization problem with a constraint of selecting the target value which is the closest to the original target value r from the corrected target value candidates w which satisfy the constraint of the control output y at each time k. More specifically, as described in expression (3) as follows, over a finite prediction horizon, the corrected target value candidate w with the distance from the original target value r becoming minimum within the range in which the above described constraint is satisfied, that is, the corrected target value candidate w which minimizes the evaluation function J(w) is searched for. Subsequently, the optimal solution which is obtained by solving expression (3) is used as the corrected target value $w_k$ at the time k. Note that y^(k+i|k) expresses the control output prediction value at the time point of a time k+i based on information at the time point of the time k. $N_h$ represents the prediction horizon (the number of prediction steps).

[Mathematical expression 3]

$$\min J(w) = \|r_k - w\|^2 \quad (3)$$

$$\text{subject to } \hat{y}(k+i|k) \leq \bar{y} \,\forall i=1,\ldots,N_h \quad (3)$$

The evaluation function as the comparative example which is expressed by expression (3) is temporarily applied to the target value following control structure shown in FIG. 1, and what constraint satisfiability and transient response characteristics are obtained by a simulation using the plant model was investigated. In the simulation, two plant models were used. One is a nominal system, and the other is a perturbation system in which a dead time and parameter perturbation are added. The nominal system has a transfer function which is described in expression (4) as follows, and the perturbation system has a transfer function described in expression (5) as follows. In each of the expressions, z represents a shift operator.

[Mathematical expression 4]

$$y_k = \frac{0.3}{(z-0.7)^2} u_k \quad (4)$$

[Mathematical expression 5]

$$y_k = \frac{0.29}{(z-0.71)(z-0.72)z^3} u_k \quad (5)$$

Figures 2A, 2B:
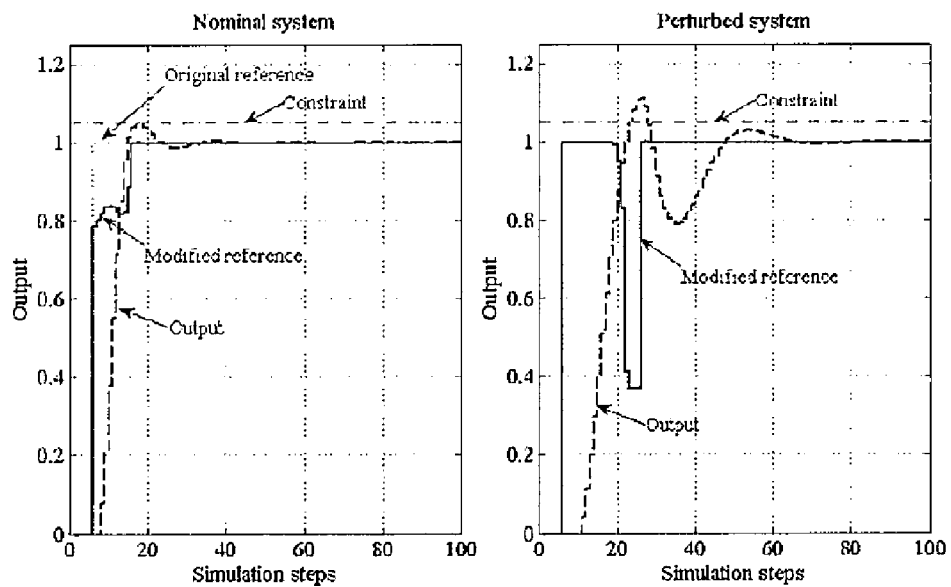
FIG. 2A is a diagram showing simulation results of transient response characteristics obtained in a target value following control structure as a comparative example.
FIG. 2B is a diagram showing simulation results of transient response characteristics obtained in a target value following control structure as a comparative example.

In the simulation, the nominal model was dealt as the plant model for use in the prediction model, and the perturbation model was dealt as an actual plant. Gains of the feedback controller were set as $K_p=0.15$, and $K_i=0.03$ respectively, and the control output upper limit value y⁻ was set at 1.05. Simulation results with respect to the case of simulating the actual plant by the nominal system and the case of simulating the actual plant by the perturbation system are shown in FIGS. 2A and 2B. A graph in FIG. 2A shows the simulation result of the nominal system, whereas a graph in FIG. 2B shows the simulation result of the perturbation system. In each of the graphs, the dotted line shows the original target value. The original target value is set at 0 in the case of 0≤k≤5, and is set at 1 in the case of k≥6. The solid line shows the corrected target value, and the broken line shows the control output.

From the simulation results shown in FIGS. 2A and 2B, it is found that when the plant has uncertainty as in FIG. 2B, the transient response characteristics degrade in the reference governor to which the evaluation function of the comparative example is applied, and the constraint is unlikely to be satisfied. In particular, a drop of the control output which occurs in the vicinity of k=35 in the graph FIG. 2B cannot be allowed in the actual plant.

The plant control device according to the present embodiment adopts the evaluation function which can achieve favorable transient response characteristics while satisfying a constraint even when the plant has uncertainty. An estimation function J(w) that is expressed by expression (6) as follows is the evaluation function adopted in the plant control device according to the present embodiment.

[Mathematical expression 6]

$$J(w) = \|r_k - w\|^2 + \rho \sum_{i=1}^{N_h} \max\{\hat{y}(k+i|k) - (\bar{y} - \delta_{\bar{y}}), 0\} \quad (6)$$

The first term on the right side of the evaluation function J(w) shown in expression (6) is an objective function with the corrected target value candidate w as a variable. The objective function is configured so that the smaller the distance between the original target value r and the corrected target value candidate w is the smaller value the objective function takes. The second term on the right side of the evaluation function J(w) is a penalty function. The penalty function is configured to add a penalty to the objective function when the control output prediction value y^ conflicts with the constraint. In the penalty function, a weighting constant ρ for weighting the penalty, and an offset constant δ for widening the constraint region by taking a margin from the control output upper limit value y⁻ are set. According to the penalty function, when the control output prediction value y^ is equal to or larger than the difference between the control output upper limit value y⁻ which is the constraint and the offset constant δ, a value obtained by multiplying the difference between the control output prediction value y^ and the constraint by the weighting constant ρ is added to the objective function. In the plant control device according to the present embodiment, the corrected target value candidate w which makes the evaluation function J(w) shown in expression (6) minimum is used as the corrected target value $w_k$ at the time k. Note that the evaluation function J(w) shown in expression (6) can be solved as an optimization problem without a constraint.

Figure 3A:
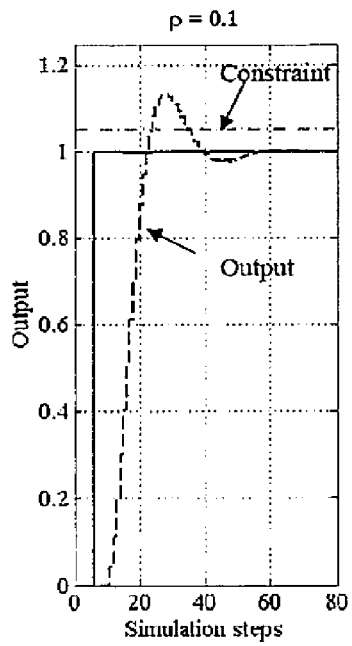
FIG. 3A is a diagram showing simulation results of the transient response characteristics obtained in the target value following control structure of the plant control device according to embodiment 1 of the present invention.
Figure 3B:
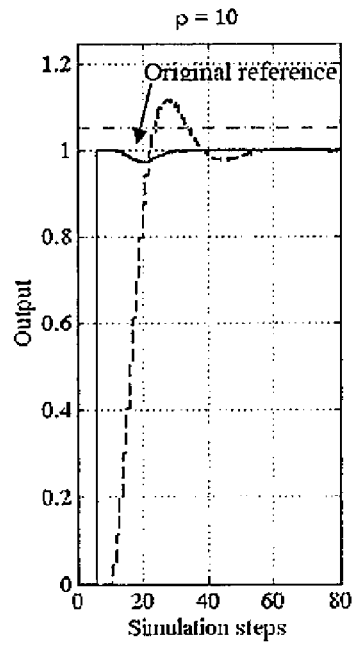
FIG. 3B is a diagram showing simulation results of the transient response characteristics obtained in the target value following control structure of the plant control device according to embodiment 1 of the present invention.
Figure 3C:
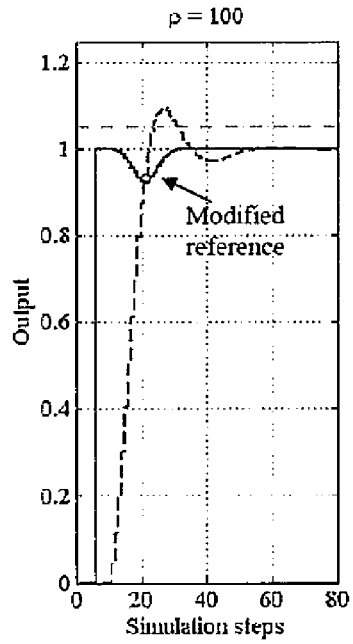
FIG. 3C is a diagram showing simulation results of the transient response characteristics obtained in the target value following control structure of the plant control device according to embodiment 1 of the present invention.

Effectiveness of the evaluation function J(w) expressed by expression (6) is confirmed by a simulation using the reference governor in which the evaluation function J(w) is implemented. In the simulation, an actual plant was simulated by the perturbation model used in the comparative example. The simulation results are shown in FIGS. 3A, 3B, and 3C. A graph in FIG. 3A shows the simulation result in the case of setting the weighting constant ρ at 0.1, a graph in FIG. 3B shows the simulation result in the case of setting the weighting constant ρ at 10, and a graph in FIG. 3C shows the simulation result in the case of setting the weighting constant ρ at 100. As matters common to the respective simulation results, the gain and the control output upper limit value y⁻ of the feedback controller were set as the same as in the case of the comparative example, and the offset constant δ was set at 0.05. Further, in each of the graphs, the dotted line shows the original target value. The original target value is set as zero in the case of 0≤k≤5, and is set as one in the case of k≥6. The solid line shows the corrected target value, and the broken line shows the control output.

From the simulation results shown in FIGS. 3A, 3B, and 3C, it has been confirmed that according to the evaluation function J(w) expressed by expression (6), favorable transient response characteristics can be obtained even when the plant has uncertainty. This becomes more obvious by comparison with the simulation result according to the comparative example shown in FIGS. 2A and 2B. Further, from comparison of the three simulation results of FIGS. 3A, 3B, and 3C, it has been found that the waveform of the control output at the time of transient response can be shaped by adjustment of the weighting constant ρ, and the larger the weighting constant ρ is, the more favorable transient response characteristics are obtained. Note that though in the simulation of this time, the offset constant δ is not changed, the waveform of the control output at the time of transient response can be also shaped by adjusting the offset constant δ.

Incidentally, when the target value following control structure using the reference governor is applied to the actual plant, the evaluation function J(w) is desirably enabled to be optimized online. However, for the purpose of online optimization of the evaluation function J(w), the following items need to be calculated.

(i) Calculation of a prediction string y^(k+i|k), i=1, 2, . . . , $N_h$ using the prediction model with respect to the corrected target value candidate w (ii) Calculation of the evaluation function J(w)

(iii) Search for a minimum value of the evaluation function J(w)

Item (i) can be realized by performing repeated calculation of the closed loop system with the state x(k) at each time k as an initial value. Item (ii) can be also achieved if the state obtained in item (i) and the future prediction of the output are available. In regard with item (iii), in order to enable application to the plant the characteristics of which significantly change in response to the operation conditions, a minimum value searching method which can perform online search, and enables real-time implementation has to be selected. In the plant control device according to the present embodiment, as the method for searching for the minimum value of the evaluation function J(w), a steepest descent method which is a known method is adopted.

FIG. 4 is a diagram showing program description of an optimization algorithm of the evaluation function J(w) which is adopted in the present embodiment. As is described in the third line of the program shown in FIG. 4, when the steepest descent method is applied to the online optimization of the evaluation function J(w), a gradient ∇ of the evaluation function J(w) is approximated by expression (7) as follows. In expression (7), $w_{cand}$ represents the corrected target value candidate, and $\Delta_{ref}$ represents a predetermined very small value. The gradient ∇ which is calculated by expression (7) expresses a gradient in the vicinity of the corrected target value candidate $W_{cand}$. By using the approximate expression like this, direct calculation of the gradient by differentiation and partial differentiation can be made unnecessary.

[Mathematical expression 7]

$$\nabla = \frac{J(w_{cand} + \Delta_{ref}) - J(w_{cand} - \Delta_{ref})}{2\Delta_{ref}} \quad (7)$$

In the program shown in FIG. 4, φ denotes a proportional coefficient for searching for the corrected target value candidate $W_{cand}$ proportionally to the gradient ∇ of the evaluation function. A value φ∇ that is obtained by multiplying the gradient ∇ by the proportional coefficient φ is an update amount until a corrected target value candidate of the next time from the present corrected target value candidate. The closer the corrected target value candidate $w_{cand}$ is to the optimal value, the closer a value of the gradient $\nabla$ is to zero. In a process thereof, a sign of the gradient $\nabla$ is inverted each time the corrected target value candidate $w_{cand}$ passes the optimal value. In the program shown in FIG. 4, as described in lines 5 to 6 in the program, the value of the proportional coefficient $\phi$ is reduced to half each time the sign of the gradient $\nabla$ of this time is inverted from the sign of the gradient $\nabla_{prev}$ of the previous time. That is to say, each time the sign of the gradient $\nabla$ is inverted, the update amount of the corrected target value candidate $w_{cand}$ is reduced. By performing the processing like this, repetition of search in the vicinity of the optimal corrected target value is reduced, and convergence of calculation can be quickened while hunting of search is prevented.

Next, a specific example of the plant control device according to the present embodiment will be described. In the present example, the plant control device according to the present embodiment is configured as a control device for an aftertreatment system of a diesel engine. The aftertreatment system of the diesel engine is a plant in which the characteristics change in response to the operation conditions, and is one of especially preferable plants as the control target of the plant control device according to the present invention.

Figure 5:
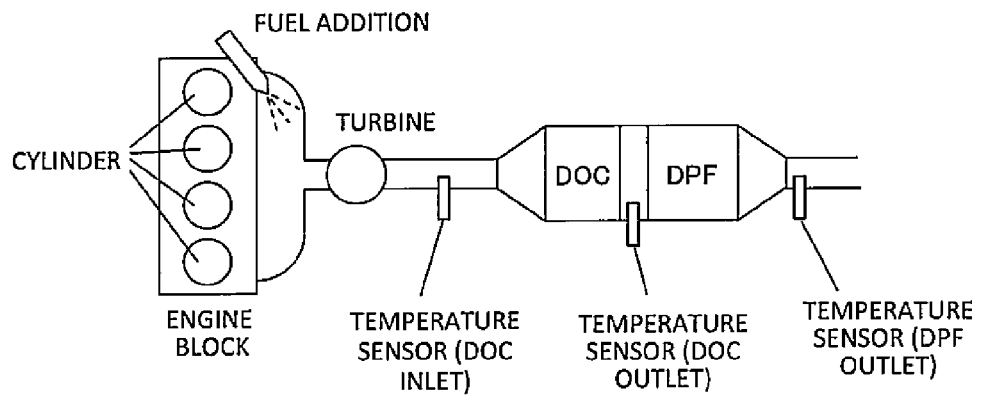
FIG. 5 is a diagram showing a configuration of an aftertreatment system of a diesel engine.

FIG. 5 is a schematic diagram showing a configuration of the aftertreatment system of a diesel engine. The aftertreatment system includes a DOC (Diesel Oxidation Catalyst) and a DPF (Diesel Particulate Filter). A temperature sensor for measuring an inlet temperature of the DOC is mounted upstream of the DOC in an exhaust passage and downstream of a turbine of a supercharger. A temperature sensor for measuring an outlet temperature of the DOC is mounted between the DOC and the DPF. A temperature sensor for measuring an outlet temperature of the DPF is mounted downstream of the DPF.

The aftertreatment system shown in FIG. 5 includes a fuel addition valve in an exhaust port of a cylinder head, as an actuator for temperature control thereof. When fuel is introduced into the catalyst from the fuel addition valve, a chemical reaction occurs, whereby a catalyst temperature increases. Upper limit temperatures that are allowable are present in both of the DOC and the DPF, and the upper limit temperatures are constraints in the temperature control of the aftertreatment system. In the present example, temperature models were prepared for the DOC and the DPR respectively, and future prediction by the reference governor was performed by using the temperature models.

Figure 6:
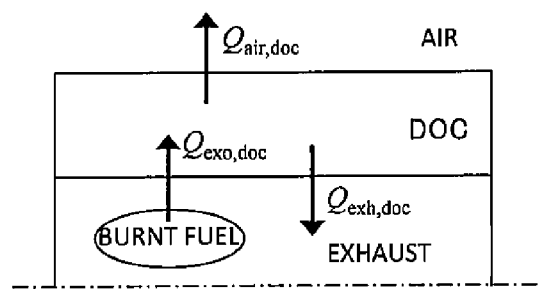
FIG. 6 is a diagram showing heat transfer in a DOC (Diesel Oxidation Catalyst).

FIG. 6 is a schematic diagram showing heat transfer in the DOC. In FIG. 6, $Q_{air,doc}$ represents a heat transfer coefficient to air from the DOC, $Q_{exo,doc}$ represents exoergic reaction heat, and $Q_{exh,doc}$ is a heat transfer coefficient to an exhaust gas from the DOC. From the drawing, a differential equation concerning a DOC temperature $T_{doc}$ shown in expression (8) as follows can be obtained. In expression (8), $C_{doc}$ represents a specific heat capacity of the DOC, and $M_{doc}$ represents a mass of the DOC.

[Mathematical expression 8]

$$\frac{dT_{doc}}{dt} = \frac{1}{C_{doc}M_{doc}}[Q_{exo,doc} - Q_{air,doc} - Q_{exh,doc}] \quad (8)$$

Expression (8) can be expressed as in expression (9) as follows. In expression (9), $Q_{exo,doc}(Q_{inj},T_{doc})$ means that $Q_{exo,doc}$ is a function of a fuel addition amount $Q_{inj}$ and a DOC temperature $T_{doc}$. A heat transfer constant from outside air is denoted by $K_{atm}$, $T_{atm}$ represents an outside air temperature, $h_{doc}$ represents a convective heat transfer constant between the DOC and an exhaust gas, $A_{doc}$ represents a convection surface area of the DOC, W represents a mass flow rate of the exhaust gas, $C_{gas}$ represents a specific heat capacity of the exhaust gas, $T_{doc,us}$ represents an exhaust gas temperature upstream of the DOC, and $R_{doc}$ represents a temperature weighting constant of the DOC. In the present example, the differential equation concerning the DOC temperature $T_{doc}$ expressed by expression (9) is prepared as the temperature model of the DOC.

[Mathematical expression 9]

$$\frac{dT_{doc}}{dt} = \frac{1}{C_{doc}M_{doc}}\left[Q_{exo,doc}(Q_{inj}, T_{doc}) - K_{atm}(T_{doc} - T_{atm}) - \frac{N_{Q,exh,doc}}{D_{Q,exh,doc}}\right] \quad (9)$$

$$N_{Q,exh,doc} = h_{doc}A_{doc}WC_{gas}(T_{doc} - T_{doc,us})$$

$$D_{Q,exh,doc} = WC_{gas} + (1 - R_{doc})h_{doc}A_{doc}$$

Figure 7:
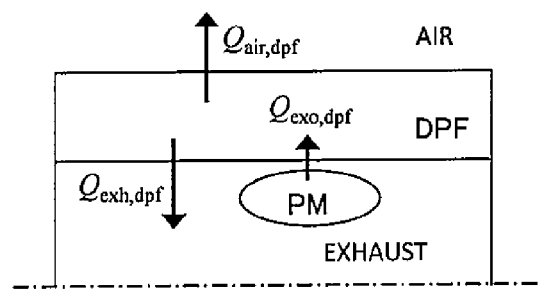
FIG. 7 is a diagram showing heat transfer in a DPF (Diesel Particulate Filter).

FIG. 7 is a schematic diagram showing heat transfer in the DPF. In FIG. 7, $Q_{air,dpf}$ represents a heat transfer coefficient to air from the DPF, $Q_{exo,dpf}$ represents exoergic reaction heat, and $Q_{exh,dpf}$ represents a heat transfer coefficient to the exhaust gas from the DPF. From the drawing, a differential equation concerning a DPF temperature $T_{dpf}$ shown in expression (10) as follows can be obtained. In expression (10), $C_{dpf}$ represents a specific heat capacity of the DPF, and $M_{dpf}$ represents a mass of the DPF.

[Mathematical expression 10]

$$\frac{dT_{dpf}}{dt} = \frac{1}{C_{dpf}M_{dpf}}[Q_{exo,dpf} - Q_{air,dpf} - Q_{exh,dpf}] \quad (10)$$

Expression (10) can be expressed as in expression (11) as follows. In expression (11), $Q_{exo,dpf}(W, m_{pm}, Q_{inj}, T_{doc})$ means that $Q_{exo,dpf}$ is a function of a mass flow rate W of the exhaust gas, a mass $m_{pm}$ of particulate, the fuel addition amount $Q_{inj}$ and a DPF temperature $T_{dpf}$. A convective heat transfer constant between the DPF and the exhaust gas is denoted by $h_{dpf}$, $A_{dpf}$ represents a convection surface area of the DPF, and $R_{dpf}$ represents a temperature weighting constant of the DPF. In the present example, the differential equation concerning the DPF temperature $T_{dpf}$ expressed by expression (11) is prepared as the temperature model of the DPF.

[Mathematical expression 11]

$$\frac{dT_{dpf}}{dt} = \frac{1}{C_{dpf}M_{dpf}} \quad (11)$$

$$\left[Q_{exo,dpf}(W, m_{pm}, Q_{inj}, T_{dpf}) - K_{atm}(T_{dpf} - T_{atm}) - \frac{N_{Q,exh,dpf}}{D_{Q,exh,dpf}}\right]$$

$$N_{Q,exh,dpf} = h_{dpf}A_{dpf}WC_{gas} \times [WC_{gas}(T_{dpf} - T_{doc,us}) + h_{doc}A_{doc}(T_{dpf} - T_{doc}) + R_{doc}h_{doc}A_{doc}(T_{doc,us} - T_{dpf})]$$

$$D_{Q,exh,dpf} = (WC_{gas} + (1 - R_{doc})h_{doc}A_{doc})(WC_{gas} + (1 - R_{dpf})h_{dpf}A_{dpf})$$

By combining expression (9) and expression (11), a state space model expressed by expression (12) as follows can be obtained. In the state space model, the DOC temperature $T_{doc}$ and the DPF temperature $T_{dpf}$ are state quantities $X_p$ of the system, and respectively have upper limit constraints. Further, the mass flow rate W of the exhaust gas, the outside air temperature $T_{atm}$, the mass $m_{pm}$ of particulate and the exhaust gas temperature $T_{doc,us}$ upstream of the DOC are exogenous inputs d which are inputted to the system. The control input u of the system in the state space model is the fuel addition amount $Q_{inj}$, and the control output y of the system is the DPF temperature $T_{dpf}$. In the reference governor according to the present example, the state space model expressed by expression (12) is used as the model of the aftertreatment system.

[Mathematical expression 12]

$$\dot{x}_p = f_p(x_p, u, d)$$

$$y = T_{dpf}$$

$$z_p = [T_{doc} T_{dpf} e]^T \in R^2, u = Q_{inj} \in R,$$

$$d = [W T_{atm} m_{pm} T_{doc,us}]^T \in R^4, y \in R \quad (12)$$

In the present example, in order to confirm effectiveness of application of the present invention to the temperature control of the aftertreatment system, an experiment using an actual machine was performed.

In the experiment in the present example, an automobile including a four-cylinder diesel engine of two liters equipped with an aftertreatment system having a DOC and a DPF was used. The algorithm of the reference governor was implemented in a rapid prototype controller, and the fuel addition amount signal of the on-vehicle controller was overwritten in accordance with the calculation result. In the reference governor, a sampling time of the plant model was set at five seconds, and the prediction horizon $N_h$ was set at 24, whereby the future of 120 seconds was predicted.

Figure 8:
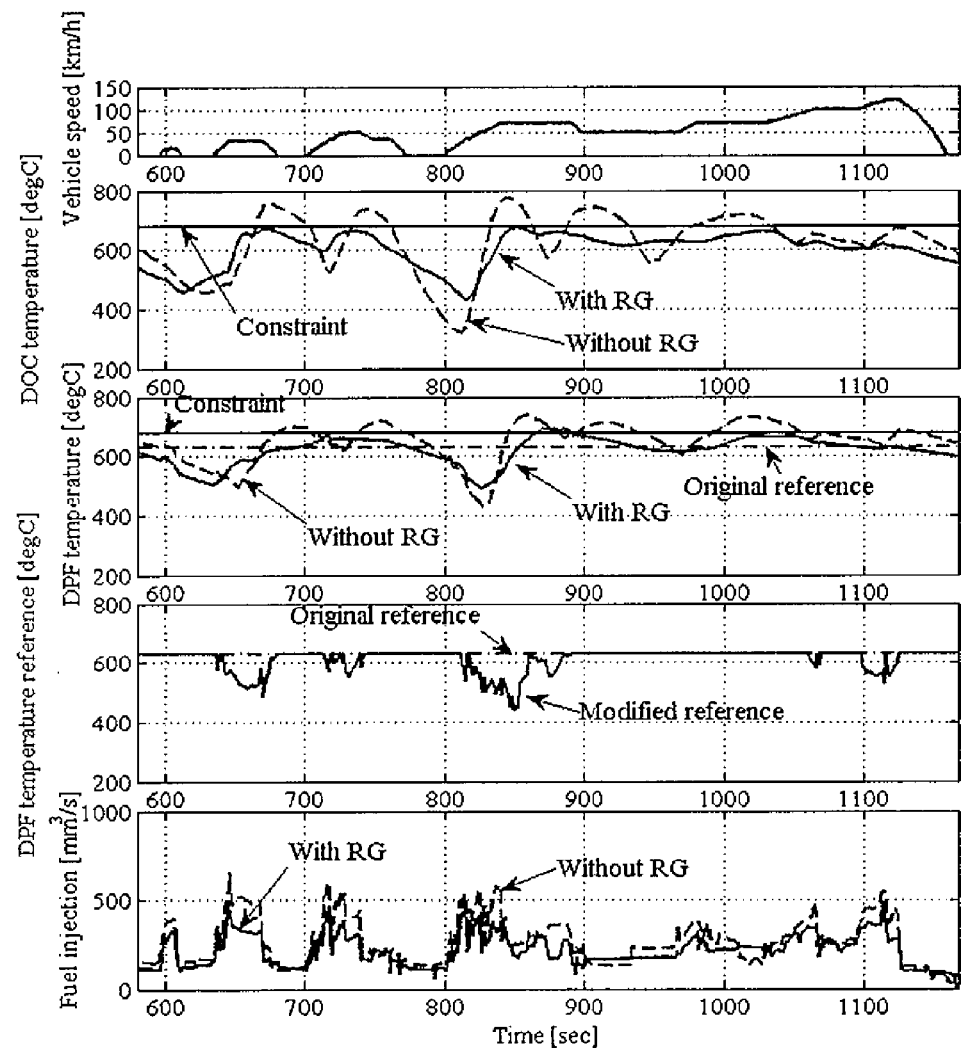
FIG. 8 is a diagram showing an experimental result in a case of applying the plant control device according to embodiment 1 of the present invention to control of the aftertreatment system shown in FIG. 6.

FIG. 8 shows the experimental result in the present example. A first graph from the top in FIG. 8 shows a temporal change of a vehicle speed. A second graph shows a temporal change of the DOC temperature. A third graph shows a temporal change of the DPF temperature. A fourth graph shows temporal changes of the original target value and the corrected target value. A fifth graph shows a temporal change of the fuel addition amount. In the third, fourth and fifth graphs, the curved lines drawn in the solid lines show the control results according to the present example, that is, the control results obtained by applying the aforementioned reference governor to the feedback controller. Meanwhile, the curved lines drawn in the broken lines show comparative examples, and show control results obtained by only the feedback controller without performing correction of the target values by the reference governor. In the experiment, the original target value of the DPF temperature was set at 630° C., and the upper limit temperatures which were the constraints with respect to the DOC temperature and the DPF temperature were set at 680° C.

From FIG. 8, it is found that in the control using the reference governor, the behavior which satisfies the temperature constraints on the DOC and the DPF can be realized, and a variation of the temperature is small, irrespective of a large change in the exogenous input accompanying with the change in the mass flow rate of the exhaust gas. From the control result, it has been able to be confirmed that application of the present invention to the temperature control of the aftertreatment system is effective.

Embodiment 2

Next, embodiment 2 of the present invention will be described with reference to the drawings.

Figure 9:
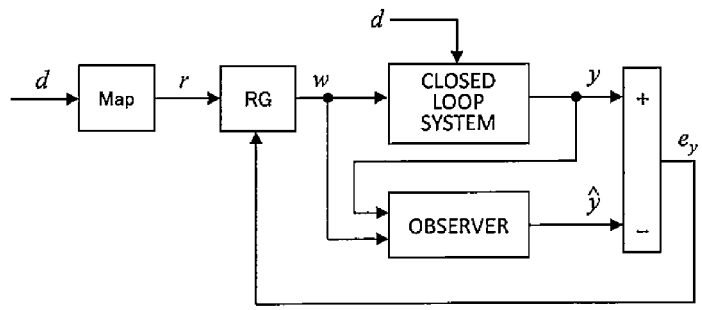
FIG. 9 is a diagram showing a target value following control structure of a plant control device according to embodiment 2 of the present invention.

FIG. 9 is a diagram showing a target value following control structure of a plant control device according to the present embodiment. The present plant control device includes a target value map (MAP), a reference governor (RG), a closed loop system and an observer. The closed loop system is configured by a feedback controller and a plant which is a control target, as described in embodiment 1. To the closed loop system, the corrected target value w from the reference governor and the exogenous input d are inputted. By these inputs, the state quantity x and the control output y of the closed loop system are determined. In more detail, the state quantity x and the control output y can be expressed by expression (13) as follows. Expression (13) is a model expression which is obtained by modeling the closed loop system. The reference governor uses a model expressed by expression (13) as a prediction model.

[Mathematical expression 13]

$$x_{k+1} = f(x_k, w_k, d_k)$$

$$y_k = g(x_k, w_k, d_k) \quad (13)$$

The observer is configured to estimate a state of the closed loop system by using the model of the closed loop system. In more detail, an estimated value $\hat{x}$ of the state quantity x calculated by the observer and an estimated value $\hat{y}$ of the control output y can be expressed by expression (14) as follows. Expression (14) is a model expression of the model used by the observer. Functions f and g are equal to those of the prediction model used by the reference governor. An observer gain is denoted by L, and is multiplied by an error between the control output y and the control output estimated value $\hat{y}$.

[Mathematical expression 14]

$$\hat{x}_{k+1} = f(\hat{x}_k, w_k, d_k) + L(y_k - \hat{y}_k)$$

$$\hat{y}_k = g(\hat{x}_k, w_k, d_k) \quad (14)$$

In the target value following control structure of the plant control device according to the present embodiment, the difference between the actual control output y of the plant and the control output estimated value $\hat{y}$ estimated by the observer is calculated as an output estimated error $e_y$. The calculation can be performed by the reference governor. The output estimated error $e_y$ expresses presence or absence and a magnitude of a modeling error. When the modeling error is present, the output estimated error $e_y$ does not become zero.

The modeling error influences determination of conflict with a constraint by the evaluation function J(w). In determination of conflict with a constraint, a control output predicted value predicted in the model is used, and therefore, when the modeling error is large, there is a possibility of the actual control output to conflict with a constraint, even if the control output predicted value does not conflict with the constraint. If the influence which the modeling error has on the satisfiability of the constraint is considered, the range of the constraint is desirably enlarged in the determination of conflict with the constraint by the evaluation function J(w), in the region where the modeling error is large.

The evaluation function J(w) which is used by the reference governor in the present embodiment is the evaluation function J(w) expressed by expression (6) similarly to the case of embodiment 1. With this evaluation function J(w), the range of the constraint can be changed by changing the value of the offset constant δ in the penalty function of the second term on the right side. Thus, in the present embodiment, design of the reference governor is performed to change the offset constant δ of the evaluation function J(w) proportionally to the output estimated error $e_y$. According to this, in the region where the modeling error is large, the constraint region can be enlarged by taking a large margin from the control output upper limit value $y^-$, and therefore, satisfiability of the constraint can be prevented from being reduced due to the modeling error.

Others

The present invention is not limited to the aforementioned embodiments, and can be carried out by being variously modified within the range without departing from the gist of the present invention.

In the aforementioned example, the plant control device according to embodiment 1 was applied to the aftertreatment system of a diesel engine. However, the control target plant of the plant control device according to embodiment 1 can be made a diesel engine main body (DE) as shown in FIG. 10A to FIG. 10I. The same applies to the plant control device according to embodiment 2.

Figure 10A:
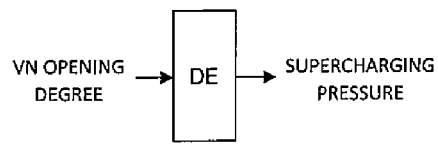
FIG. 10A is a diagram showing examples of control inputs and control outputs of a diesel engine to which the plant control device according to the present invention is applicable.
Figure 10B:
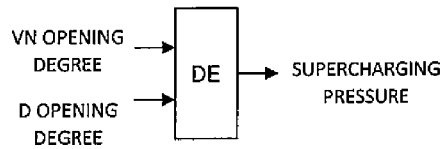
FIG. 10B is a diagram showing examples of control inputs and control outputs of a diesel engine to which the plant control device according to the present invention is applicable.

When the control target plant is a diesel engine main body, a control input can be made a variable nozzle opening degree (VN opening degree) and a control output can be made a supercharging pressure as shown in FIG. 10A. That is to say, the present invention can be applied to supercharging pressure control of the diesel engine. In this case, as shown in FIG. 10B, the control inputs also can be made a variable nozzle opening degree and a diesel throttle opening degree (D opening degree).

Figure 10C:
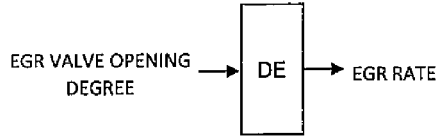
FIG. 10C is a diagram showing examples of control inputs and control outputs of a diesel engine to which the plant control device according to the present invention is applicable.
Figure 10D:
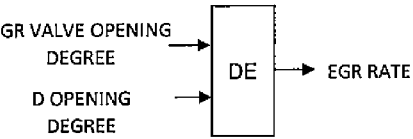
FIG. 10D is a diagram showing examples of control inputs and control outputs of a diesel engine to which the plant control device according to the present invention is applicable.

Further, as shown in FIG. 10C, the control input can be made an EGR valve opening degree, and the control output can be made an EGR rate. That is to say, the present invention can be applied to EGR control of a diesel engine. In this case, as shown in FIG. 10D, the control input can be made the EGR valve opening degree and the diesel throttle opening degree.

Figure 10E:
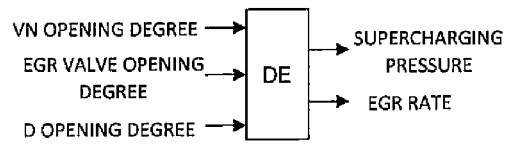
FIG. 10E is a diagram showing examples of control inputs and control outputs of a diesel engine to which the plant control device according to the present invention is applicable.

Furthermore, as shown in FIG. 10E, the control inputs can be made the variable nozzle opening degree, the EGR valve opening degree and the diesel throttle opening degree, and the control outputs can be made a supercharging pressure and the EGR rate. That is to say, the present invention can be applied to cooperative control of the supercharging pressure and the EGR rate in a diesel engine.

Figure 10F:
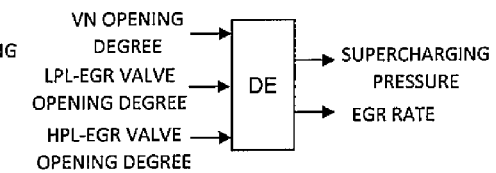
FIG. 10F is a diagram showing examples of control inputs and control outputs of a diesel engine to which the plant control device according to the present invention is applicable.
Figure 10G:
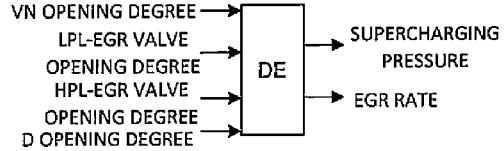
FIG. 10G is a diagram showing examples of control inputs and control outputs of a diesel engine to which the plant control device according to the present invention is applicable.
Figure 10H:
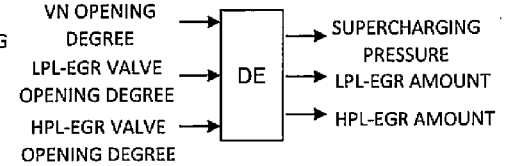
FIG. 10H is a diagram showing examples of control inputs and control outputs of a diesel engine to which the plant control device according to the present invention is applicable.
Figure 10I:
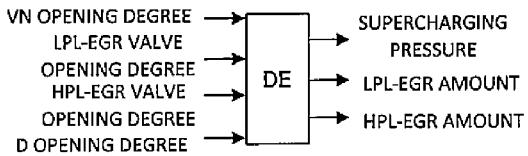
FIG. 10I is a diagram showing examples of control inputs and control outputs of a diesel engine to which the plant control device according to the present invention is applicable.

When the diesel engine of the control target has a low pressure EGR system and a high pressure EGR system, the control inputs can be made an EGR valve opening degree of the low pressure EGR system (LPL-EGR valve opening degree), and an EGR valve opening degree of the high pressure EGR system (HPL-EGR valve opening degree), as shown in FIG. 10F and FIG. 10G. Further, as shown in FIG. 10H and FIG. 10I, the control outputs can be made the EGR amount of the low pressure EGR system (LPL-EGR amount), and an EGR amount of the high pressure EGR system (HPL-EGR amount).

Furthermore, the plant to which the plant control device according to the present invention is applied is not limited to only a diesel engine. For example, the plant control device also can be applied to a fuel battery system, besides other on-vehicle power plants such as a gasoline engine and a hybrid system. Furthermore, the plant control device according to the present invention can be applied to a wide range of plants including a stationary plant, if only the plants can perform control by using reference governors and feedback controllers.

The invention claimed is:

1. A plant control device, comprising:
a feedback controller that determines a control input of a plant by feedback control so as to bring an output value of a control amount of the plant close to a target value; and
a reference governor
wherein the reference governor is configured to:
search for a corrected target value candidate that minimizes an evaluation function by repeating a first calculation and a second calculation several times while changing the corrected target value candidate; and
determine the corrected target value candidate that minimizes the evaluation function as a corrected target value to be given to the feedback controller,
wherein the first calculation is to calculate, by using a prediction model which is obtained by modeling a closed loop system including the plant and the feedback controller, a future predicted value of a specific state quantity of the plant based on a state quantity of the plant at a current time, an error integration value of the feedback controller at the current time, an exogenous input at the current time, and the corrected target value candidate, and
the second calculation is to calculate the evaluation function that is expressed by an objective function that is expressed by a distance between the target value and the corrected target value candidate, and a penalty function that is configured to add to the objective function a penalty corresponding to a difference between the future predicted value and a constraint that is imposed on the specific state quantity when the future predicted value conflicts with the constraint.

2. The plant control device according to claim 1,
wherein the reference governor searches for the corrected target value candidate that minimizes the evaluation function by updating the corrected target value candidate with an update amount proportional to a gradient of the evaluation function according to a steepest descent method.

3. The plant control device according to claim 2,
wherein the reference governor updates the corrected target value candidate by an update amount proportional to a gradient of the evaluation function, and decreases a proportional coefficient which is multiplied by the gradient each time a sign of the gradient is inverted.

4. The plant control device according to claim 1, further comprising:
an observer that estimates a state of the closed loop system by using the model of the closed loop system,
wherein the reference governor corrects a value of a constraint that is defined by the penalty function in accordance with an error between an estimated value of the specific state quantity estimated by the observer and an actual value of the specific state quantity obtained from the plant.

* * * * *

UNITED STATES PATENT AND TRADEMARK OFFICE
CERTIFICATE OF CORRECTION

PATENT NO. : 9,574,505 B2  
APPLICATION NO. : 14/423859  
DATED : February 21, 2017  
INVENTOR(S) : Hayato Nakada Page 1 of 1

It is certified that error appears in the above-identified patent and that said Letters Patent is hereby corrected as shown below:

In the Specification

Column 6, Line 20, change "$\hat{y}(k+i\mid k) \leq \overline{y} \ \forall i=1,\ldots,N_h$" to "$\hat{y}(k+i\mid k) \leq \overline{y} \quad \forall i=1,\ldots,N_h$"

Column 8, Line 46, change "a gradient v of the" to "a gradient $\nabla$ of the"

Column 11, Line 24, change "$z_p=[T_{doc}T_{dpf}e]^T \in R^2$" to "$x_p=[T_{doc}T_{dpf}]^T \in R^2$"

Signed and Sealed this  
Twenty-eighth Day of August, 2018

Andrei Iancu  
*Director of the United States Patent and Trademark Office*